US012145390B2

(12) United States Patent
Sato

(10) Patent No.: US 12,145,390 B2
(45) Date of Patent: Nov. 19, 2024

(54) SHEET WITH FEEDING PERFORATION

(71) Applicant: CCL Label, Inc., Framingham, MA (US)

(72) Inventor: Jay Sato, Mission Viejo, CA (US)

(73) Assignee: CCL Label, Inc., Framingham, MA (US)

( * ) Notice: Subject to any disclaimer, the term of this patent is extended or adjusted under 35 U.S.C. 154(b) by 264 days.

(21) Appl. No.: 17/983,791

(22) Filed: Nov. 9, 2022

(65) Prior Publication Data

US 2023/0071681 A1 Mar. 9, 2023

Related U.S. Application Data

(63) Continuation of application No. 17/673,928, filed on Feb. 17, 2022, now Pat. No. 11,590,788, which is a continuation of application No. 16/289,761, filed on Mar. 1, 2019, now Pat. No. 11,279,162.

(60) Provisional application No. 62/636,896, filed on Mar. 1, 2018.

(51) Int. Cl.
*B41M 5/50* (2006.01)
*B42D 15/00* (2006.01)
*G09F 3/02* (2006.01)

(52) U.S. Cl.
CPC ........... *B41M 5/502* (2013.01); *B42D 15/008* (2013.01); *G09F 2003/0226* (2013.01); *G09F 2003/0269* (2013.01)

(58) Field of Classification Search
CPC .................. B41M 5/502; B42D 15/008; G09F 2003/0226; G09F 2003/0269
See application file for complete search history.

(56) References Cited

U.S. PATENT DOCUMENTS

| | | | |
|---|---|---|---|
| D2,856 | S | 12/1867 | Stafford |
| D17,746 | S | 9/1887 | Melinger |
| D79,566 | S | 10/1929 | Rau |
| D120,517 | S | 5/1940 | Steffen |
| 2,276,297 | A | 3/1942 | Flood |
| 2,303,346 | A | 12/1942 | Flood |
| 2,304,787 | A | 12/1942 | Avery |
| 2,331,019 | A | 10/1943 | Flood |
| 2,420,045 | A | 5/1947 | Krug |
| 2,434,545 | A | 1/1948 | Brady |
| D168,758 | S | 2/1953 | Odzer |
| 2,679,928 | A | 6/1954 | Bishop |
| 2,681,732 | A | 6/1954 | Brady |
| 2,765,205 | A | 10/1956 | Capella |
| 2,883,044 | A | 4/1959 | Kendrick |
| D189,472 | S | 12/1960 | Currie |

(Continued)

*Primary Examiner* — Jacob T Minskey
*Assistant Examiner* — Stephen M Russell
(74) *Attorney, Agent, or Firm* — McDonald Hopkins LLC

(57) ABSTRACT

A printable sheet assembly and method provide for feeding cardstock sheets through a printer. The printable sheet assembly may include a first fold region. The first fold region comprises a robust perforated line disposed horizontally across the sheet assembly. The printable sheet assembly may include a second fold region. The second fold region may comprise a second robust perforated line disposed horizontally across the sheet assembly. The sheet assembly may include a product such as a name tag, business card, label, or card formed into the sheet assembly and configured to be processed through a printer device to receive indicia thereon.

16 Claims, 7 Drawing Sheets

(56) References Cited

U.S. PATENT DOCUMENTS

| | | | |
|---|---|---|---|
| D190,360 | S | 5/1961 | Cohen |
| 3,006,793 | A | 10/1961 | Wheeler |
| 3,038,597 | A | 6/1962 | Brady |
| 3,166,186 | A | 1/1965 | Kam |
| 3,228,710 | A | 1/1966 | Chodorowski |
| 3,230,649 | A | 1/1966 | Kam |
| 3,315,387 | A | 4/1967 | Heuser |
| 3,361,252 | A | 1/1968 | Wise |
| 3,480,198 | A | 11/1969 | Repko |
| 3,568,829 | A | 3/1971 | Brady |
| 3,805,426 | A | 4/1974 | Cunningham |
| 3,822,492 | A | 7/1974 | Crawley |
| 3,825,463 | A | 7/1974 | Amann |
| 3,854,229 | A | 12/1974 | Morgan |
| 2,859,157 | A | 1/1975 | Morgan |
| 3,896,246 | A | 7/1975 | Brady |
| 3,914,483 | A | 10/1975 | Stipek |
| 3,965,327 | A | 6/1976 | Ehlscheid |
| 4,032,679 | A | 6/1977 | Aoyagi |
| 4,060,168 | A | 11/1977 | Romagnoli |
| 4,061,808 | A | 12/1977 | Sato |
| 4,217,164 | A | 8/1980 | La Mers |
| 4,264,662 | A | 4/1981 | Taylor |
| 4,317,852 | A | 3/1982 | Ogden |
| 4,356,375 | A | 10/1982 | Josephy |
| 4,428,857 | A | 1/1984 | Taylor |
| 4,446,183 | A | 5/1984 | Savagian |
| 4,454,180 | A | 6/1984 | La Mers |
| 4,478,666 | A | 10/1984 | Ogden |
| 4,524,095 | A | 6/1985 | Gocket |
| 4,537,809 | A | 8/1985 | Ang |
| 4,584,219 | A | 4/1986 | Baartmans |
| 4,599,125 | A | 7/1986 | Buck |
| 4,619,851 | A | 10/1986 | Sasaki |
| 4,637,635 | A | 1/1987 | Levine |
| 4,648,930 | A | 3/1987 | La Mers |
| 4,704,317 | A | 11/1987 | Hickenbotham |
| 4,706,877 | A | 11/1987 | Jenkins |
| 4,771,891 | A | 9/1988 | Sorenson |
| 4,787,158 | A | 11/1988 | Vitol |
| 4,799,712 | A | 1/1989 | Biava |
| D300,692 | S | 4/1989 | Le Brocquy |
| 4,833,122 | A | 5/1989 | Doll et al. |
| 4,846,504 | A | 7/1989 | MacGregor |
| 4,850,612 | A | 7/1989 | Instance |
| 4,865,204 | A | 9/1989 | Vance |
| 4,881,935 | A | 11/1989 | Slobodkin |
| 4,881,936 | A | 11/1989 | Slobodkin |
| D306,321 | S | 2/1990 | Gramera |
| 4,910,058 | A | 3/1990 | Jameson |
| 4,951,970 | A | 8/1990 | Burt |
| 4,952,433 | A | 8/1990 | Tezuka |
| 4,978,146 | A | 12/1990 | Warther |
| 4,983,438 | A | 1/1991 | Jameson |
| 5,011,559 | A | 4/1991 | Felix |
| 5,031,939 | A | 7/1991 | Webendorfer |
| 5,091,035 | A | 2/1992 | Anhaeuser |
| 5,129,682 | A | 7/1992 | Ashby |
| 5,135,261 | A | 8/1992 | Cusack et al. |
| 5,139,836 | A | 8/1992 | Burke |
| 5,182,152 | A | 1/1993 | Ericson |
| 5,192,612 | A | 3/1993 | Otter |
| 5,227,209 | A | 7/1993 | Garland |
| 5,230,938 | A | 7/1993 | Hess |
| 5,284,689 | A | 2/1994 | Laurash |
| 5,318,325 | A | 6/1994 | Ipsen |
| 5,324,153 | A | 6/1994 | Chess |
| 5,328,538 | A | 7/1994 | Garrison |
| 5,332,265 | A | 7/1994 | Groess |
| 5,340,427 | A | 8/1994 | Cusack et al. |
| 5,346,766 | A | 9/1994 | Otter |
| 5,389,414 | A | 2/1995 | Popat |
| 5,407,718 | A | 4/1995 | Popat |
| 5,462,783 | A | 10/1995 | Esselmann |
| 5,468,085 | A | 11/1995 | Kline |
| 5,484,168 | A | 1/1996 | Chigot |
| 5,487,915 | A | 1/1996 | Russ |
| 5,487,929 | A | 1/1996 | Rusincovitch |
| 5,489,456 | A | 2/1996 | Instance |
| 5,503,435 | A | 4/1996 | Kline |
| 5,509,694 | A | 4/1996 | Laurash |
| 5,512,343 | A | 4/1996 | Shaw |
| 5,520,990 | A | 5/1996 | Rotemund |
| 5,536,546 | A | 7/1996 | Nash |
| 5,571,587 | A * | 11/1996 | Bishop .................... G03G 7/00 283/105 |
| 5,601,314 | A | 2/1997 | Burns |
| 5,633,071 | A | 5/1997 | Murphy |
| 5,658,631 | A | 8/1997 | Bernstein |
| 5,662,976 | A | 9/1997 | Popat |
| 5,686,159 | A | 11/1997 | Langan |
| 5,700,535 | A | 12/1997 | Galsterer |
| 5,720,499 | A | 2/1998 | Sakashita |
| 5,756,175 | A | 5/1998 | Washburn |
| 5,782,494 | A | 7/1998 | Crandall |
| 5,788,284 | A | 8/1998 | Hirst |
| 5,789,050 | A | 8/1998 | Kang |
| 5,842,722 | A | 12/1998 | Carlson |
| 5,866,249 | A | 2/1999 | Yarusso |
| 5,947,525 | A | 9/1999 | Pollman |
| 5,958,536 | A | 9/1999 | Gelsinger |
| 5,981,013 | A | 11/1999 | Russ |
| 5,993,928 | A | 11/1999 | Popat |
| 5,997,683 | A | 12/1999 | Popat |
| 6,001,209 | A | 12/1999 | Popat |
| 6,004,643 | A | 12/1999 | Scheggetman |
| 6,013,154 | A | 1/2000 | Thomas-Cote |
| D423,044 | S | 4/2000 | Burke et al. |
| 6,086,107 | A | 7/2000 | Whistler et al. |
| 6,132,829 | A | 10/2000 | Kennerly |
| 6,132,831 | A | 10/2000 | Thomas-Cote |
| 6,136,130 | A | 10/2000 | Tataryan |
| 6,159,570 | A | 12/2000 | Ulrich |
| 6,170,879 | B1 | 1/2001 | Rawlings |
| 6,177,163 | B1 | 1/2001 | Blok et al. |
| 6,221,192 | B1 | 4/2001 | Walsh |
| 6,277,229 | B1 | 8/2001 | Popat |
| 6,277,456 | B1 | 8/2001 | Bulgrin et al. |
| D448,404 | S | 9/2001 | Hamilton |
| 6,284,708 | B1 | 9/2001 | Oshima |
| 6,361,078 | B1 | 3/2002 | Chess |
| 6,364,364 | B1 | 4/2002 | Murphy |
| 6,364,366 | B1 | 4/2002 | Schwartz |
| 6,391,136 | B1 | 5/2002 | Stickelbrocks |
| 6,403,184 | B1 | 6/2002 | Michlin |
| 6,410,111 | B1 | 6/2002 | Roth |
| 6,413,604 | B1 | 7/2002 | Matthews |
| 6,432,499 | B1 | 8/2002 | Roth |
| 6,479,118 | B1 | 11/2002 | Atkinson |
| 6,508,914 | B1 | 1/2003 | Schwaller et al. |
| 6,517,921 | B2 | 2/2003 | Ulrich |
| 6,521,312 | B1 | 2/2003 | Keiser |
| D471,933 | S | 3/2003 | Hodsdon |
| D475,740 | S | 6/2003 | Kuenz |
| D476,031 | S | 6/2003 | Hodsdon |
| 6,579,585 | B1 | 6/2003 | Garvic |
| 6,581,973 | B2 | 6/2003 | Levine et al. |
| 6,630,049 | B2 | 10/2003 | Hannington |
| D482,073 | S | 11/2003 | Nakajo |
| 6,656,555 | B1 | 12/2003 | McKilip |
| 6,689,238 | B2 | 2/2004 | Barnet |
| 6,737,140 | B2 | 5/2004 | Moliski |
| 6,740,431 | B2 | 5/2004 | Hoshino |
| 6,748,994 | B2 | 6/2004 | Wien et al. |
| 6,803,084 | B1 | 10/2004 | Do et al. |
| 6,837,957 | B2 | 1/2005 | Flynn |
| 6,860,050 | B2 | 3/2005 | Flynn |
| 6,861,116 | B2 | 3/2005 | Emmert |
| 6,905,747 | B2 | 6/2005 | Auchter |
| 6,926,942 | B2 | 8/2005 | Garvic |
| 6,955,843 | B2 | 10/2005 | Flynn et al. |
| 6,989,183 | B2 | 1/2006 | Attia et al. |
| 7,128,236 | B2 | 10/2006 | Presutti |
| 7,208,212 | B2 | 4/2007 | Do et al. |

(56) References Cited

U.S. PATENT DOCUMENTS

| | | | | |
|---|---|---|---|---|
| 7,246,823 | B2 | 7/2007 | Laurash | |
| 7,306,690 | B2 | 12/2007 | Hodsdon et al. | |
| 7,438,322 | B2 | 10/2008 | Miller | |
| 7,459,193 | B2 | 12/2008 | Utz | |
| 7,534,477 | B1 | 5/2009 | Waggoner et al. | |
| 7,625,619 | B2 | 12/2009 | Hodsdon et al. | |
| 7,627,972 | B2 | 12/2009 | Hodsdon | |
| 7,641,951 | B2 | 1/2010 | Hodsdon et al. | |
| 7,691,462 | B2 | 4/2010 | Erwin et al. | |
| 7,709,071 | B2 | 5/2010 | Wong et al. | |
| 7,857,353 | B2 | 12/2010 | Kuranda | |
| 7,934,751 | B2 | 5/2011 | Castillo et al. | |
| 7,954,855 | B2 | 6/2011 | Viby | |
| 7,963,564 | B2 | 6/2011 | Flynn | |
| 7,967,340 | B2 | 6/2011 | Hofer | |
| 8,169,654 | B2 | 5/2012 | Lee et al. | |
| 8,273,436 | B2 | 9/2012 | Flynn | |
| 8,455,073 | B2 | 6/2013 | Hodsdon | |
| 8,507,065 | B2 | 8/2013 | Milson | |
| D702,287 | S | 4/2014 | Kott | |
| D716,374 | S | 10/2014 | Osmanovski | |
| 9,159,250 | B2 | 10/2015 | Hong et al. | |
| 9,856,402 | B2 | 1/2018 | Hodsdon | |
| D813,945 | S | 3/2018 | Li | |
| D853,480 | S | 7/2019 | Chandra | |
| 2004/0071922 | A1 | 4/2004 | McCarthy et al. | |
| 2011/0308406 | A1* | 12/2011 | McNeil ..................... | B26F 1/26<br>101/32 |
| 2015/0266639 | A1* | 9/2015 | McDonald ............. | B65D 81/07<br>493/392 |
| 2019/0270329 | A1 | 9/2019 | Sato | |

* cited by examiner

| Auto Registration - Ink Jet Auto Feed Mode | Run #1 - MP BC Control | Run #2 - MP BC + Cal Edge | Run #3 - MP BC with MD Improvement |
|---|---|---|---|
| Side 1 | | | |
| HP DJ3050 | Pass | Pass | Pass |
| Epson 410 | Pass | Pass | Pass |
| HP 8610 (u-turn printer) | FAIL (3 ORS off about 9/32") | FAIL (3 ORS off about 6/32") | Pass |
| Number of Sheets Tested | 90 | 90 | 90 |
| Number of Major Defects | 3 | 6 | 0 |
| Defect Rate % | 3% | 7% | 0% |

FIG. 5

SHEET WITH FEEDING PERFORATION

CROSS-REFERENCE TO RELATED APPLICATIONS

This application is a continuation of U.S. application Ser. No. 17/673,928 filed on Feb. 17, 2022, which is a continuation of Ser. No. 16/289,761 filed on Mar. 1, 2019, now U.S. Pat. No. 11,279,162, which claims priority to and the benefit of U.S. Provisional Patent Application No. 62/636,896 filed Mar. 1, 2018 titled, "SHEET WITH FEEDING PERFORATION," each of which are hereby incorporated by reference in their entireties.

FIELD OF INVENTION

The present disclosure generally relates to a sheet assembly and method of making a sheet assembly that is to be processed through a printer to print indicia thereon. More particularly, the disclosure relates to a sheet assembly with perforations that improve printer processing of the sheet.

BACKGROUND

Sheets for printing are well known and various types have been proposed to meet the requirements of a wide variety of applications. Some applications include card products such as badge inserts, business cards, tent cards, and nametags. Card products may include perforations to allow such products to be folded, torn, or the like.

In another example, labels and nametags are used in businesses to provide information about a product, person, or the like. Labels and nametags generally include a facestock layer with an adhesive side and an exposed side. The exposed side includes a surface for receiving indicia thereon and is opposite from the adhesive side. A liner sheet is operably attached to the adhesive side and is configured to allow a user to peel the label portion of the facestock from the liner sheet to be placed on a substrate. A plurality of cut lines may separate the facestock layer into a plurality of labels in various arrangements.

Other card products or sheets may have a single layer without adhesives. These sheets are typically thicker than ordinary printer paper. The sheets may also be stiffer as the card products may be placed into a sleeve or display.

However, problems arise when a user processes label sheets or cardstock through a printer, such as an inkjet printer, desktop printer, or laser printer. Many printers are configured to receive a cardstock or other sheet and process it through at least one, but usually more than one, rotary mechanisms during the printing process. The thickness or stiffness of cardstock may cause the printer to print with gross off-registration. In some instances, the card products may bend or fold in certain areas as it goes through a printer feed path which may causes gross off-registration. This may cause ink to shift or other printing errors.

Therefore, there is a need for a printable sheet assembly for cardstock configured to reduce inconsistent processing through a printer device. There is also a need for an improved method of feeding a cardstock sheet through a printer to accurately apply ink or indicia thereon without unduly altering the alignment or registration of the print, while making perforations more robust and maintaining ability for separation and a smooth edge.

SUMMARY

The present system leverages the advantages of a printable sheet assembly with surface features. A printable sheet assembly is described herein. A printable sheet assembly comprises a sheet body having a first edge and an opposite second edge wherein said first edge and second edge comprise horizontal edges of the sheet body. A first fold region comprising at least one robust perforation line formed horizontally within the first fold region, wherein the first fold region is defined by a first boundary and a second boundary. The robust perforation line comprises a tensile strength that is about or greater than 80 Newtons per 2 linear inches of perforations. Said sheet body may be processed by a printer device to receive printed indicia thereon and the at least one robust perforation line assists to prevent printing errors due to off registration when the printable sheet assembly is processed through said printer device. The first boundary comprises the first edge of the printable sheet assembly and the second boundary may be generally 1.5 inches from the first edge. In an embodiment, the first boundary may be generally 2.75 inches from said first edge of the printable sheet assembly and the second boundary may be generally 3.25 inches from the first edge. A second fold region comprising at least one robust perforation line formed within the second fold region, wherein the second fold region is defined by a first boundary and a second boundary wherein the first boundary of the second fold region is generally 5.25 inches from the first edge and the second boundary of the second fold region is generally 5.75 inches from the first edge. At least one alternate perforated line may be formed in the sheet body for defining at least one of a label, business card, card, or a nametag in the sheet body. The at least one robust perforation line comprises alternating cuts and ties, and wherein at least one cut is about 0.010 inches and at least one tie is between about 0.006 inches and about 0.010 inches. the at least one robust perforation line comprises alternating cuts and ties, and wherein the ties are about 60%-100% the length of the cuts. The sheet body may be made from a cardstock material having a thickness between about 8 mil to about 12 mil (1/1000 inches) and having a level of rigidity wherein the at least one robust perforation line comprises a tensile strength that is selected based on the level of rigidity of the stock material such that the at least one robust perforation line and the at least one alternate perforation line do not break when the fold region passes through a U-shaped feed path of said printer device.

In an embodiment, provided is a method of making a printable sheet assembly, the method comprising providing cardstock material. A first fold region positioned horizontally along the cardstock material is identified. At least one robust perforated line is formed in the card stock generally horizontally spanning the cardstock material, wherein the at least one robust perforated line is disposed within said first fold region and comprises a tensile strength within a lower boundary and an upper boundary. At least one alternate perforated line is formed in the card stock material generally horizontally spanning the cardstock material, wherein the at least one alternate perforated line is disposed outside of the first fold region and comprises a tensile strength that is less than the tensile strength of the at least one robust perforated line wherein said cardstock material is configured to be processed by a printer device to receive printed indicia thereon and the at least one robust perforation line assists to prevent printing errors due to off registration when the printable sheet assembly is processed through said printer device. The lower boundary may be about 80 Newtons per 2 linear inches of perforations and the upper boundary may be about 250 Newtons per 2 linear inches of perforations. At least one robust perforated line and at least one alternate perforated line may be formed in a shape of a card or label to receive indicia thereon when processed through a printer device.

In another embodiment, provided is a printable sheet assembly comprising a cardstock material having a first edge and an opposite second edge wherein said first edge and second edge comprise horizontal edges of the cardstock. A first fold region aligned horizontally along the cardstock material, wherein the first fold region is defined by a first boundary and a second boundary. At least one robust perforated line formed generally horizontally along the cardstock material, wherein the at least one robust perforated line is disposed within said first fold region and comprises a tensile strength that is about or greater than 80 Newtons per 2 linear inches of perforations. At least one alternate perforated line formed generally horizontally along the cardstock material, wherein the at least one alternate perforated line is disposed outside of the first fold region and comprises a tensile strength that is less than the tensile strength of the at least one robust perforated line. The cardstock material is configured to be processed by a printer device to receive printed indicia thereon and the at least one robust perforation line assists to prevent printing errors due to off registration when the printable sheet assembly is processed through said printer device. The first boundary comprises the first edge of the printable sheet assembly and the second boundary is generally 1.5 inches from the first edge. In an embodiment, the first boundary may be generally 2.75 inches from the first edge of the printable sheet assembly and the second boundary is generally 3.25 inches from the first edge. A second fold region comprising at least one robust perforation line formed within the second fold region, wherein the second fold region is defined by a first boundary and a second boundary. The first boundary of the second fold region is generally 5.25 inches from the first edge of the printable sheet assembly and the second boundary of the second fold region is generally 5.75 inches from the first edge. The robust perforated line includes cuts and ties of about 0.005" cut/0.010" tie along its length and said alternate perforated line includes cuts and ties of about 0.005" cut/0.005" tie along its length.

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

BRIEF DESCRIPTION OF THE DRAWINGS

Operation of the disclosure may be better understood by reference to the following detailed description taken in connection with the following illustrations, wherein:

FIG. 5 is a table illustrating data representing prior art embodiments of printable sheet assemblies processing through various printer devices and embodiments of printable sheet assemblies of the current disclosure being processed through various printer devices.

DETAILED DESCRIPTION

Figure 1A:
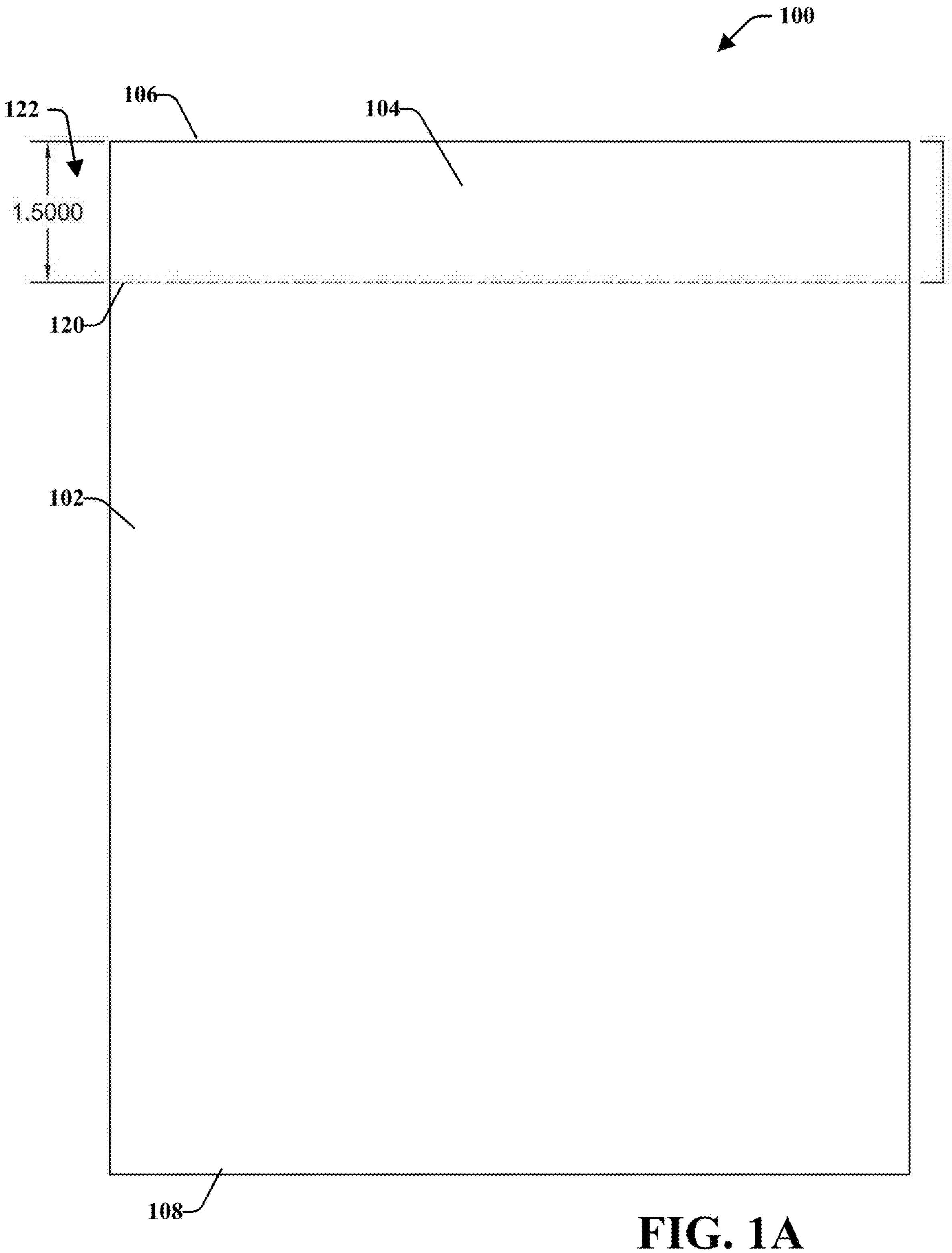
FIG. 1A is a plan view of an embodiment of a printable sheet assembly with one fold region near an edge of the sheet in accordance with various disclosed embodiments.

Reference will now be made in detail to embodiments of the present disclosure, examples of which are illustrated in the accompanying drawings. It is to be understood that other embodiments may be utilized and structural and functional changes may be made without departing from the respective scope of the disclosure. Moreover, features of the various embodiments may be combined or altered without departing from the scope of the disclosure. As such, the following description is presented by way of illustration only and should not limit in any way the various alternatives and modifications that may be made to the illustrated embodiments and still be within the spirit and scope of the disclosure.

A sheet assembly (e.g., label sheet, nametag sheet, card product etc.) may comprise a sheet body, a cardstock sheet, printable papers, printable films, non-woven materials, polyolefin materials, and laminates thereof. The sheet facestock may be a single layer or may include different layers, such as a liner, an adhesive, and a facestock layer. It is noted that the different layers may comprise different materials have different properties. For instance, a first layer may comprise a cardstock and a second layer may comprise a less stiff or less thick layer.

Described sheet assemblies may be a cardstock material or sheet body that have various sizes, such as A3, A4, 8½ inches by 11 inches, 8½ inches by 14 inches, 11 inches by 17 inches, legal size or any other size, including, without limitation smaller sizes. Generally, a sheet assembly is operatively sized to be fed through a desktop printer and/or copier (such as by way of a non-limiting example an ink jet and/or laser printer). For instance, a sheet assembly may be fed through a horizontal-feed inkjet printer.

In certain inkjet printers, gross off-registration of the print on card stock having perforations can occur. It has been found that a fold in sheet assemblies in such printers can cause a retardation of the transport of the sheet assembly, which in turn leads to off-registration of the print. As such, consumers may be left with sheets having errors on the indicia printed thereon. This may result in a need to reprint the sheet.

Described embodiments include printable sheet assemblies comprising robust perforated fold lines within at least one area. The robust perforated fold line alters (e.g., improves) feeding of the sheet assemblies through a printer. For instance, the perforation may allow for increased flexibility while maintaining ease of separation and a smooth edge. As described herein, the perforation may be more robust or exaggerated in certain areas such that the perforations do not break as easily when the sheet is flexed about the perforations. Embodiments describe the relative bending strength of perforations in fold zones of a sheet or cardstock product compared to the bend resistance of the uncut sheet material. In some examples, the tensile strength of the perforations in the fold zones is directly related to the perforation bend strength. The tensile strength is at or above minimum strength to prevent the perforations from breaking as the sheet curves through the feed path of a printer. This minimum strength may be needed in the fold or critical zones as a rigid sheet may not be able to relive much stress on the perforations. As such, the minimum strength may reduce or prevent breakage of the perforations in the fold zones. It is noted that the perforation strength may be selected based on a rigidity or flexibility of the material utilized for the sheet. For instance, a lower tensile strength of perforations may be utilized for more flexible material as the material itself will flex and relieve stress on the perforations to prevent or reduce breakage. Whereas a higher tensile strength of perforations may be utilized for a sheet comprising a more rigid material. Accordingly, ranges of tensile strength described herein are exemplary and related to the particular cardstock selected to illustrate the various embodiments.

Embodiments of printable sheets may include perforations in areas that are more robust in those areas while still maintaining ease-of-separation and a smooth finished product edge. As an exemplary embodiment, perforations may comprise a tensile strength of generally greater than or equal to 80 Newtons per 2 linear inches of perforations and less than or equal to about 250 Newtons per 2 linear inches of perforations. Cardstock having robust perforations with such tensile strength may be robust enough to effectively prevent the gross off-registration. The measurement of 80 Newtons per 2 linear inches of perforations may be the low threshold transition between good registration and bad registration occurs, where a lower tensile strength is likely to result in registration errors when processed through a printer device and a higher tensile strength will result in registrations without the noted errors. Perforations generally comprise alternating cuts and ties. In some embodiments, the cut-to-tie ratio or the overall size of either cuts or ties may affect the tensile strength of the perforations. Robust perforation line designs that deliver a tensile strength within the above range while still maintaining a smooth edge range from about 0.010" cut/0.006" tie to 0.010" cut/0.010" tie, or have a tie length that is about 60%-100% of the cut length.

As shown in FIG. 1, a printable sheet assembly 100 is disclosed and may be of any appropriate size and configuration as described herein. For instance, the printable sheet assembly 100 may be of an A4 size and may be formed of cardstock. The sheet assembly 100 may be made of any appropriate materials and colors or indicia and this disclosure is not limited in this regard.

Sheet assembly 100 may include a first edge 106 and a second edge 108. First edge 106 and second edge 108 may comprise horizontal edges of the sheet assembly 100. In some embodiments, first edge 106 may be referred to as a top edge and second edge 108 may be referred to as a bottom edge. As an example, the second edge 108 may be fed into a printer. The printer may print onto the sheet assembly 100 and may continue to feed the sheet assembly 100 through the printer until first edge 106 exits the printer.

A robust perforated line 124 (See FIG. 1B) may be formed or otherwise disposed within a fold region 122. In an aspect, the fold region 122 may comprise a first boundary (e.g., first edge 106) and a second boundary 120. The robust perforated line 124 may be formed at or between the first boundary and the second boundary 120. The perforated line may be formed via a microperforation process. In an aspect, the perforation may be die-cut. In an aspect, the perforation generally runs horizontally across the sheet assembly 100.

The second boundary 120 may be about 1.5 inches from the first edge 106. In an aspect, the robust perforated line 124 may define a boundary between a first body section 102 and a second body section 104. Moreover, while embodiments may refer to "a" or "the" perforated line 124, 126, 128 it is noted that the one or more types of perforated lines may be formed or otherwise disposed of along the sheet assembly or within the defined fold regions. For example, FIGS. 6 and 7 illustrate sheet assemblies having various defined fold regions that include a plurality of perforated lines 124, 126, 128. In FIG. 1A, robust perforated line 124 is provided along with alternate perforated lines 126. Here, robust perforated line 124 has a stronger tensile strength and different microperferation structure than the alternate perforated lines 126 where robust perforated line 124 includes cuts and ties of about 0.005" cut/0.010" tie along its length while the alternate perforated lines 126 include cuts and ties of about 0.005" cut/0.005" tie along its length. Notably, the robust perforated lines 124 and alternate perforated lines 126 may extend in a horizontal orientation but may also include a gap 132 therein as identified by FIG. 3B. The gap 132 may assist in defining printable cards, labels or other print receiving media defined within the printable sheet assemblies disclosed herein.

Location of a robust perforated line 124 within the defined fold regions 122 may allow the sheet assembly 100 to pass through the printer with decreased chances of misalignment. This may prevent or reduce print errors for cardstock or label sheet assemblies having a facestock layer with a liner layer, such as sheet assemblies with a thickness between about 8 to about 12 mil (1/1000 inches). Moreover, the robust perforated line 124 within the fold region 122 may be formed to coincide with an edge of a label, nametag, or the like. In other embodiments, the robust perforated line 124 may be formed in an area that does not align with an edge of a label or nametag, and does not pass through a label or nametag (e.g., such as in a matrix).

Figure 2:
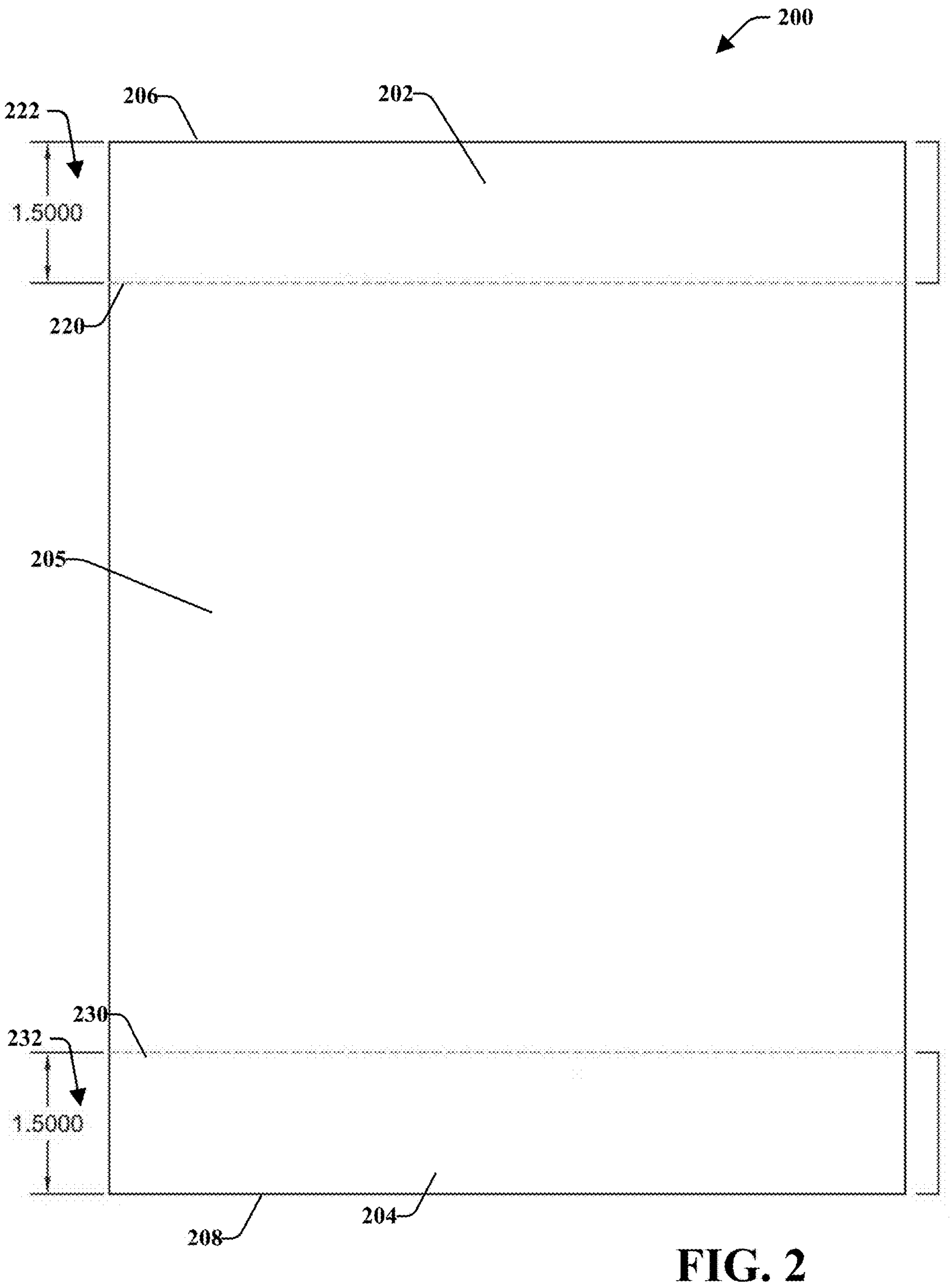
FIG. 2 is a plan view of an embodiment of a printable sheet assembly with two fold regions near edges of the sheet in accordance with various disclosed embodiments.

As illustrated by FIG. 2, there is a printable sheet assembly 200 comprising a first edge 206 and a second edge 208. The sheet assembly 200 may comprise a first fold region 222 and a second fold region 232. It is noted that the first fold region 222 may comprise similar aspects as the fold region 122 of FIG. 1A. For instance, the first fold region 222 may comprise a first boundary at the first edge 206 and a second boundary 220. The second boundary 220 may be about 1.5 inches from the first edge 206 of first boundary.

Figure 1B:
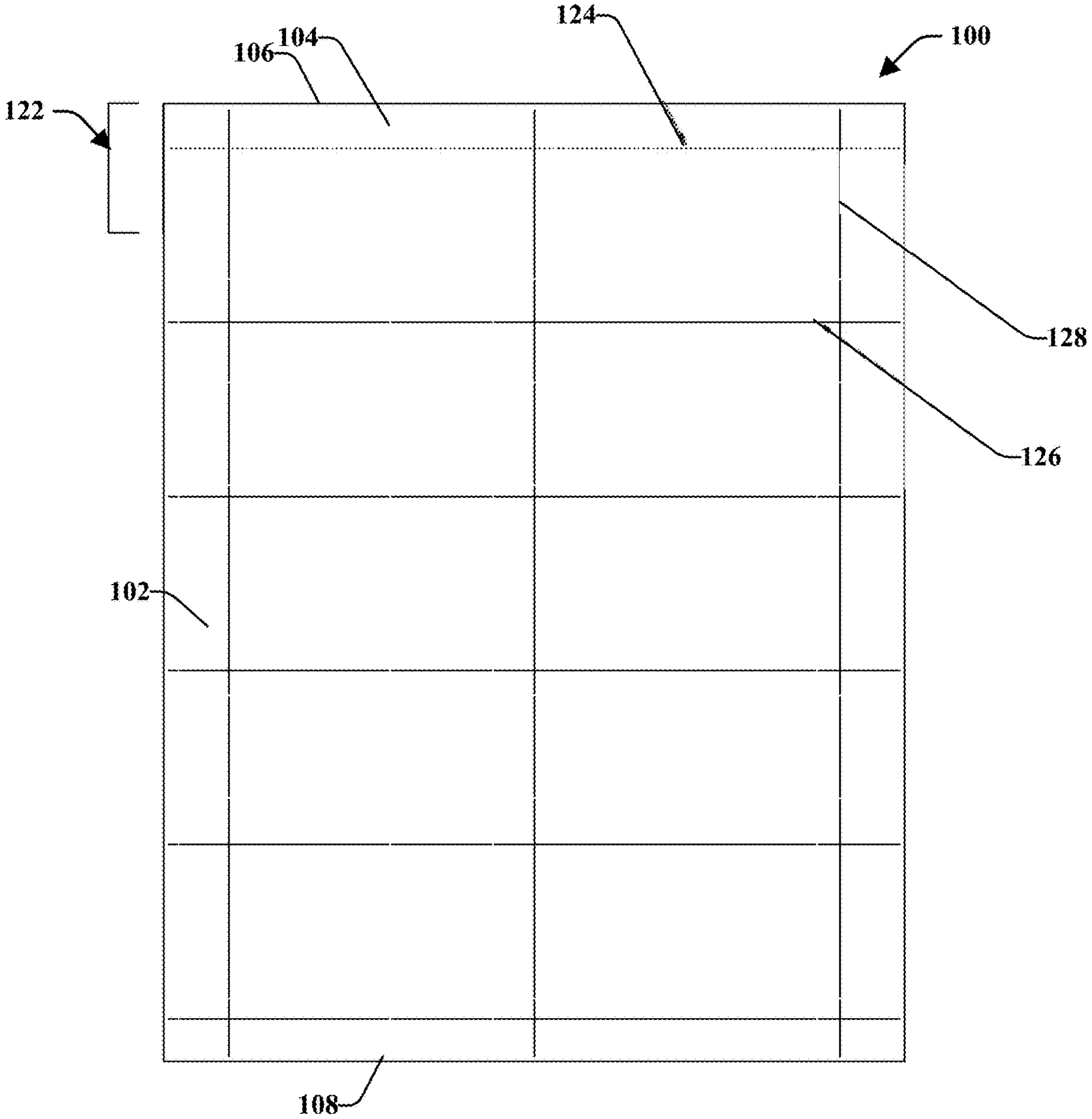
FIG. 1B is a plan view of an embodiment of a printable sheet assembly with robust perforation line within a fold region near an edge of the sheet along with alternate perforation lines outside of the fold region of the sheet assembly of FIG. 1A in accordance with various disclosed embodiments.

The second fold region 232 may be similarly defined by a first boundary at second edge 208 and a second boundary 230 that may be generally 1.5 inches from the second edge 208. In an aspect, the first fold region 222 may be a first body section 202 and the second fold region 232 may be a second body section 204 wherein a third body section 205 may be spaced between the first and second fold regions. As described herein, one or more robust perforated lines 124 (see FIG. 1B) may be disposed horizontally within the first fold region 222 and the second fold region 232 and alternate perforated lines 126 (FIG. 1B) may be disposed horizontally along the third body section 205. In some embodiments, having two fold regions at either end of the sheet assembly 200 may allow a user to feed the sheet assembly 200 into a printer starting at either the first edge 206 or the second edge 208 to experience a reduction in off-registration and duplicate sheet processing through a printing device. Notably, vertically arranged fold lines or alternate perforation lines 128 may be formed vertically along the sheet assembly as illustrated by FIG. 1B and may cross over the identified fold regions.

Figure 3A:
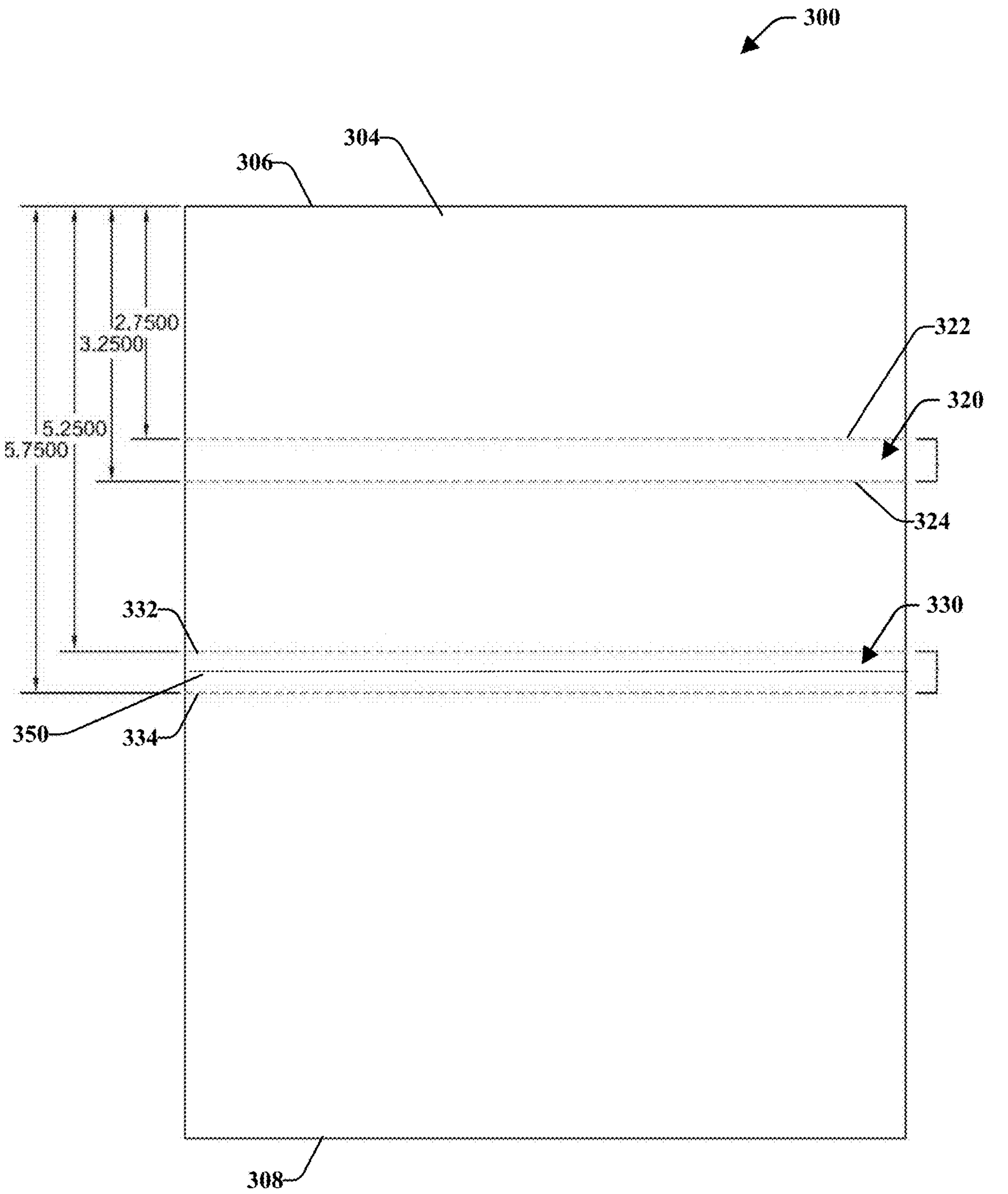
FIG. 3A is a plan view of an embodiment of a printable sheet assembly with two fold regions that are at or between a vertical midpoint of the sheet and an edge of the sheet in accordance with various disclosed embodiments.
Figure 3B:
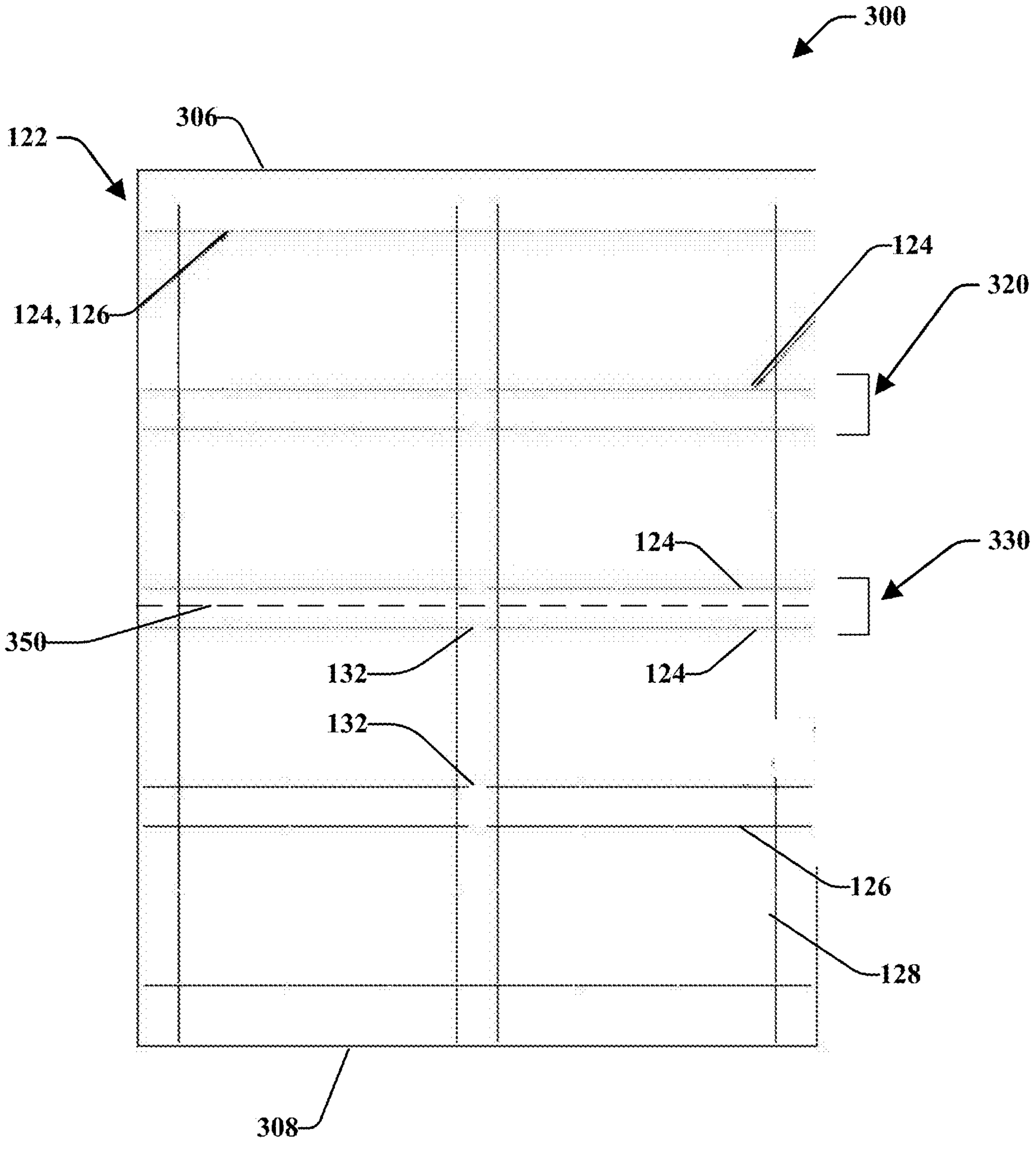
FIG. 3B is a plan view of an embodiment of a printable sheet assembly with robust perforation lines within defined fold regions and alternate perforation lines outside of the defined fold regions of the sheet assembly of FIG. 3A in accordance with various disclosed embodiments.

Turning now to FIGS. 3A and 3B, there is a printable sheet assembly 300 in accordance with various disclosed aspects. It is noted that sheet assembly 300 may include similar aspects as described with reference to the other figures. For example, sheet assembly 300 may include a printable cardstock that may reduce or eliminate print errors due to gross off-set. It is noted that the location of horizontal fold lines or perforations may be selected based on a make or model of a printer.

The sheet assembly 300 may generally comprise a first edge 306 and a second edge 308. While embodiments describe that the sheet assembly 300 may be fed into a printer device at the second edge 308, it is noted that the sheet assembly 300 may be fed into the printer at the first edge 306.

According to embodiments, the sheet assembly 300 may comprise one or more fold regions, such as a first fold region 320 and a second fold region 330. In an aspect, the first fold region 320 may be disposed horizontally along the sheet assembly 300 positioned between the first edge 306 and a center or general vertical middle 350. The second fold region 320 may encompass a region located horizontally along the vertical middle 350. It is noted that the first fold region 320 and the second fold region 330 may be generally equal in size, such as about 0.5 inches in length. It is noted, however, that the length may be appropriately greater or lesser than 0.5 inches in different or other embodiments. As an illustrative example, the first fold region 320 may comprise a first boundary 322 and a second boundary 324. For sheet assemblies that are 8.5×11 inches, the first boundary 322 may be generally 2.75 inches from the first edge 306. The second boundary 324 may be generally 3.25 inches from the first edge 306. The second fold region 330 similarly comprises a first boundary 332 and a second boundary 334. For sheet assemblies that are 8.5×11 inches, the first boundary 332 may be generally 5.25 inches from the first edge 306. The second boundary 334 may be 5.75 inches from the first edge 306. Notably, these dimension may be adjusted proportionately for various dimensioned sheet assemblies such as A3, A4, 8½ inches by 11 inches, 8½ inches by 14 inches, 11 inches by 17 inches, legal size or any other size, including, without limitation smaller sizes.

The first fold region 320 and the second fold region 330 may comprise one or more fold lines or robust perforations 124 as shown in FIG. 3B. The robust perforations 124 may run horizontally across the sheet assembly 300. As described herein, the robust perforations 124 within such fold regions may be configured to have a higher tensile strength than the alternate perforated lines 126 or other perforations that exist along portions that are outside the defined fold regions. The difference between the robust fold lines or perforations 124 and the alternate fold lines or perforations 126 may comprise a tensile strength between a minimum threshold and a maximum threshold. During a printing operation, the existence of robust perforations 124 within the predetermined fold regions may prevent or reduce occurrences of print errors, such as those occurring from gross off-registration of the print.

Figure 4:
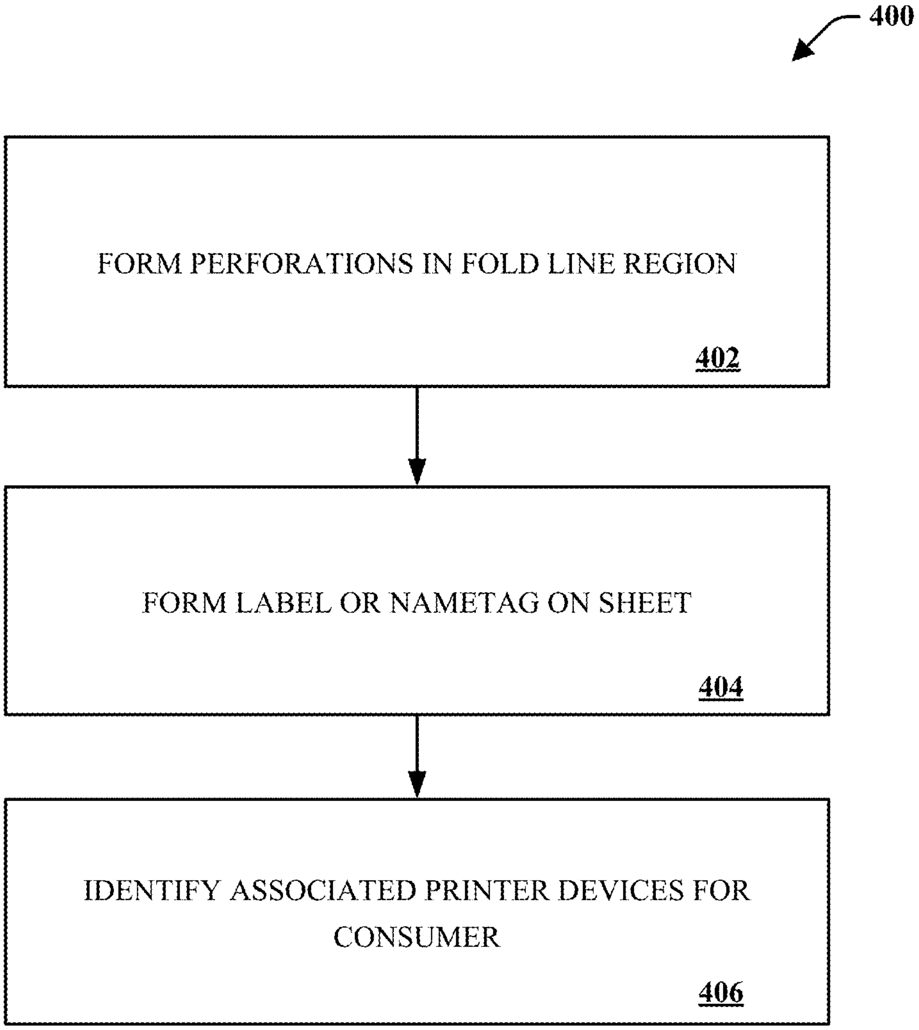
FIG. 4 is a method of forming a printable sheet assembly in accordance with various disclosed embodiments.

In view of the subject matter described herein, methods that may be related to various embodiments may be better appreciated with reference to the flowchart of FIG. 4. While the method is shown and described as a series of blocks, it is noted that associated methods or processes are not limited by the order of the blocks unless context suggests otherwise or warrants a particular order. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 4 is a flow chart of an exemplary method 400 of forming a printable sheet assembly as described herein. The method 400 may be utilized to form one or more printable sheet assemblies that generally reduce or eliminate gross off-registration of card stock in printers, such as in desktop or inkjet printers.

At 402, a system or device may form perforations on a printable sheet assembly. In an aspect, the perforations may be formed via die cutting or other processes. The printable sheet assembly may comprise card stock as described herein. According to embodiments, the perforations may be formed in regions that are located on the printable sheet assembly with reference to one or more edges of the sheet assembly.

At 404, the system or device may form a label, nametag, or other product in or on the sheet assembly. As an example, a system may die cut nametags in the cardstock of the sheet assembly. It is noted that the formation of the product may utilize the perforated lines an edge of the label, nametag, or other product. In other examples, the perforated lines may not form an edge of a product. As described herein, the formation of the perforated lines and the product may occur in various orders or generally simultaneously.

At 406, the system or device may print indicia on packaging or the sheet assembly that identifies applicable printer devices for the sheet assembly. For example, different printers may comprise differently arranged rollers, feed angles, or the like. As such, perforated lines and/or fold regions may be associated with different printers. Thus, the system or device may identify associated printers to enhance an end user's experience.

The embodiments of FIGS. 1A, 1B, 2, 3A, and 3B may be particularly advantageous when used to process sheet assemblies through printer devices that incorporate a U-turn shaped feed path within the printer device. Such printer devices may be include: HP Inkjet Printers such as the HP 8610 model. Such a U-turn shaped feed path is configured in such a manner that when a sheet assembly is placed along an inlet of the printer device, the surface that is to receive printable indicia thereon is placed face down when inserted. The U-turn feed path processes the sheet assembly to print indicia along the portion facing downwardly along the inlet wherein after receiving the printed subject matter thereon may be directed faced upwardly and presented at an outlet of the printer device.

The location of a robust perforation lines 124 within the identified fold regions for sheet assembly made of cardstock as described in FIGS. 1A, 1B, 2, 3A, and 3B was found to have an demonstrable effect on the registration of printed indicia for printer devices that include U-shaped feed paths. This advantage is demonstrated by the table illustrated in FIG. 5 when a plurality of stacked sheet assemblies are processed through various models of printer devices. FIG. 5 is a table illustrating data representing prior art embodiments of printable sheet assemblies processing through various printer devices and embodiments of printable sheet assemblies of the current disclosure being processed through various printer devices. Notably, the table illustrates the data represented of embodiments of FIGS. 1A, 1B, and 2.

The first column identifies the type of printer device tested which included printer devices that utilized ink jet, auto registrations, and auto feed modes. The HP DJ3050 and Epson 410 models do not have a U-shaped feed path. The HP 8610 model does have a U-shaped feed path. The second column identifies the type of sheet assemblies tested as microperforated (MP) business cards (BC) control (similar to FIG. 1B without a robust perforation line 124 within the identified fold region 122). The table identifies that failure or off registrations (OFS) occurred at least in 3 of 90 sheet assemblies processed in the printer device having a U-shaped feed path. However, this number was identified to be close to about 50% failure rate in other tests not included in this table. The third column identifies the type of sheet assemblies tested as microperforated (MP) business cards (BC) with a calendared edges (which is representative of the embodiment similar to FIG. 1B without a robust perforation line 124 within the identified fold region 122 but also having embossed edges along the header and footer areas which are not shown in FIG. 1B). The table identifies that failure or off registrations (OFS) occurred in at least 7 of 90 sheet assemblies processed in the printer device having a U-shaped feed path. However, this number was identified to be close to about 50% failure rate in other tests not included in this table. The third column identifies the type of sheet assemblies tested as microperforated (MP) business cards (BC) with machine direction (MD) improvement (which is representative of the embodiment in FIG. 1B having a robust perforation line 124 within the identified fold region 122). The table identifies that failure or off registrations (OFS) did not occur at all for sheet assemblies processed in the printer device having a U-shaped feed path. Off registration is when printed ink or indicia is placed along an area of the sheet assembly that is unintended due to a variety of factors. However, it is contemplated that off registration of sheet assemblies may be due to how the U-shaped feed path frictionally transports the sheet assembly in a consistent manner related to the distribution of ink from the printing device.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The features of each embodiment described and shown herein may be combined with the features of the other embodiments described herein. The claims as follows are intended to include all modifications and alterations insofar as they come within the scope of the claims or the equivalent thereof.

What is claimed is:

1. A method of making a printable sheet assembly, the method comprising:

providing cardstock material having a first edge and an opposite second edge wherein said first edge and second edge comprise horizontal edges of the cardstock material;

identifying a first fold region positioned horizontally along the cardstock material; and forming at least one robust perforated line generally horizontally spanning the cardstock material, wherein the at least one robust perforated line is disposed within said first fold region and comprises a tensile strength measured to be within a lower boundary and an upper boundary; and forming at least one alternate perforated line generally horizontally spanning the cardstock material, wherein the at least one alternate perforated line is disposed outside of the first fold region and comprises a tensile strength that is less than the tensile strength of the at least one robust perforated line;

wherein said cardstock material is configured to be processed by a printer device to receive printed indicia thereon and the at least one robust perforation line formed within said first fold region assists to prevent printing errors due to off registration when the printable sheet assembly is processed through said printer device.

2. The method of claim 1, wherein the lower boundary is about 80 Newtons per 2 linear inches of perforations.

3. The method of claim 2, wherein the upper boundary is about 250 Newtons per 2 linear inches of perforations.

4. The method of claim 1, further comprising forming at least one robust perforated line and at least one alternate perforated line in a shape of a card or a label to receive indicia thereon when processed through a printer device.

5. The method of claim 1, wherein forming the at least one robust perforation line comprises forming alternating cuts and ties, and wherein at least one cut is about 0.010 inches and at least one tie is between about 0.006 inches and about 0.010 inches.

6. The method of claim 1, wherein the first fold region is positioned adjacent the first edge of the cardstock material.

7. The method of claim 6 comprising:

identifying a second fold region positioned horizontally along the cardstock material, the second fold region being positioned between the first fold region and the second edge; and forming at least one robust perforation line within said second fold region, the at least one robust perforation line within the second fold region generally horizontally spanning the cardstock material and having a tensile strength measured to be within a lower boundary and an upper boundary.

8. The method of claim 7, wherein forming the at least one robust perforation line within the second fold region comprises forming alternating cuts and ties, and wherein at least one cut is about 0.010 inches and at least one tie is between about 0.006 inches and about 0.010 inches.

9. The method of claim 7, wherein the at least one alternate perforated line is disposed outside the second fold region such that the at least one alternate perforated line is disposed between the first fold region and the second fold region.

10. The method of claim 7, wherein the first fold region is defined by a first boundary and a second boundary, the first boundary of the first fold region is along the first edge of the printable sheet, and the second boundary of the first fold region is about 1.5 inches from the first edge; and the second fold region is defined by a first boundary and a second boundary, the first boundary of the second fold region is along the second edge of the sheet and the second boundary of the second fold regions is about 1.5 inches from the second edge.

11. The method of claim 7, wherein the tensile strength of the at least one robust perforated line disposed within the second fold region is from 80 Newtons per 2 linear inches of perforations to 250 Newtons per 2 linear inches of perforations.

12. The method of claim 6, wherein the first fold region is positioned between the first edge and a vertical center line of the sheet.

13. The method of claim 12 comprising:

identifying a second fold region positioned horizontally along the cardstock material, the second fold region positioned about the vertical center line of the sheet; and forming at least one robust perforation line within said second fold region, the at least one robust perforation line within the second fold region generally horizontally spanning the cardstock material and having a tensile strength measured to be within a lower boundary and an upper boundary.

14. The method of claim 13, wherein the first fold region is defined by a first boundary and a second boundary, the first boundary is about 2.75 inches from the first edge, and the second boundary is about 3.25 inches from the first edge; and the second fold region is defined by a first boundary and a second boundary, the first boundary of the second fold region is about 5.25 inches from the first edge of the sheet, and the second boundary is about 5.75 inches from the first edge of the sheet.

15. The method of claim 13, wherein the tensile strength of the at least one robust perforated line disposed within the second fold region is from 80 Newtons per 2 linear inches of perforations to 250 Newtons per 2 linear inches of perforations.

16. The method of claim 13, wherein forming the at least one robust perforation line within the second fold region comprises forming alternating cuts and ties, and wherein at least one cut is about 0.010 inches and at least one tie is between about 0.006 inches and about 0.010 inches.

* * * * *